United States Patent
Kawai (10) Patent No.: US 9,579,840 B2
(45) Date of Patent: Feb. 28, 2017

(54) BLOW-MOLDED CONTAINER, FUEL CONTAINER, BLOW-MOLDED BOTTLE CONTAINER, AND PRODUCTION METHOD OF BLOW-MOLDED CONTAINER

(71) Applicant: KURARAY CO., LTD., Kurashiki-shi (JP)

(72) Inventor: Hiroshi Kawai, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/026,140

(22) PCT Filed: Oct. 2, 2014

(86) PCT No.: PCT/JP2014/076438
§ 371 (c)(1),
(2) Date: Mar. 30, 2016

(87) PCT Pub. No.: WO2015/050221
PCT Pub. Date: Apr. 9, 2015

(65) Prior Publication Data
US 2016/0243746 A1    Aug. 25, 2016

(30) Foreign Application Priority Data

Oct. 2, 2013 (JP) ................. 2013-207769
Oct. 2, 2013 (JP) ................. 2013-207770

(51) Int. Cl.
| | |
|---|---|
| B29C 49/22 | (2006.01) |
| B32B 7/12 | (2006.01) |
| B32B 27/08 | (2006.01) |
| B32B 27/18 | (2006.01) |
| B32B 27/30 | (2006.01) |
| B32B 27/32 | (2006.01) |
| B32B 1/02 | (2006.01) |
| B29C 47/00 | (2006.01) |
| B29C 47/88 | (2006.01) |
| B29B 11/06 | (2006.01) |
| B29B 11/14 | (2006.01) |

(Continued)

(52) U.S. Cl.
CPC .............. *B29C 49/22* (2013.01); *B29B 11/06* (2013.01); *B29B 11/14* (2013.01); *B29C 47/0011* (2013.01); *B29C 47/0014* (2013.01); *B29C 47/8895* (2013.01); *B29C 49/0005* (2013.01); *B32B 1/02* (2013.01); *B32B 7/12* (2013.01); *B32B 27/08* (2013.01); *B32B 27/18* (2013.01); *B32B 27/306* (2013.01); *B32B 27/32* (2013.01); *B65D 1/0215* (2013.01); *B65D 65/40* (2013.01); *C08L 23/0853* (2013.01); *B29B 2911/14126* (2013.01); *B29B 2911/14633* (2013.01); *B29B 2911/14646* (2013.01); *B29K 2023/065* (2013.01); *B29K 2023/086* (2013.01); *B29K 2105/0088* (2013.01); *B29K 2105/258* (2013.01); *B29K 2995/0026* (2013.01); *B29K 2995/0089* (2013.01); *B29L 2031/7158* (2013.01); *B29L 2031/7172* (2013.01); *B32B 2270/00* (2013.01); *B32B 2272/00* (2013.01); *B32B 2307/558* (2013.01); *B32B 2307/7244* (2013.01); *B32B 2439/00* (2013.01); *B32B 2439/70* (2013.01)

(58) Field of Classification Search
CPC . B29C 49/22; B29C 47/0011; B29C 47/0014; B29C 47/8895; B29C 49/0005; B32B 7/12; B32B 27/08; B32B 27/18; B32B 27/306; B32B 27/32; B32B 1/02; B32B 2270/00; B32B 2272/00; B32B 2307/558; B32B 2307/7244; B32B 2439/00; B32B 2439/70; B29B 11/06; B29B 11/14; B29B 2911/14126; B29B 2911/14633; B29B 2911/14646; B29K 2023/065; B29K 2023/086; B29K 2105/0088; B29K 2105/258; B29K 2995/0026; B29K 2995/0089; B29L 2031/7158; B29L 2031/7172; B65D 1/0215; B65D 65/40; C08L 23/0853
See application file for complete search history.

(56) References Cited

U.S. PATENT DOCUMENTS

| | | |
|---|---|---|
| 2001/0025087 A1 | 9/2001 | Kazeto et al. |
| 2006/0047040 A1 | 3/2006 | Shida et al. |
| 2008/0003390 A1 | 1/2008 | Hayashi et al. |

FOREIGN PATENT DOCUMENTS

| | | |
|---|---|---|
| CN | 15977587 | 3/2005 |
| CN | 101006130 | 7/2007 |

(Continued)

OTHER PUBLICATIONS

International Search Report issued Jan. 13, 2015 in PCT/JP2014/076438 filed on Oct. 2, 2014.
Office Action issued Oct. 18, 2016, in Japanese Patent Application No. 2013-207770.
Office Action issued Oct. 20, 2016, in Chinese Patent Application No. 201480054562.2.

*Primary Examiner* — Michael C Miggins
(74) *Attorney, Agent, or Firm* — Oblon, McClelland, Maier & Neustadt, L.L.P.

(57) ABSTRACT

Provided is a blow-molded container exhibiting inhibited coloring, odor, and generation of defects such as gelation and streaks which are caused on melt molding, and having a superior appearance. Also provided is a blow-molded container that has a favorable self-purge feature in production and satisfactory qualities such as strength, and can be produced at low cost. The blow-molded container includes a first layer containing an ethylene-vinyl alcohol copolymer (I), wherein the first layer contains a saturated carbonyl compound (II) having 3 to 8 carbon atoms, the saturated carbonyl compound (II) is a saturated aldehyde (II-1), a saturated ketone (II-2) or a combination thereof, and the content of the saturated carbonyl compound (II) in the first layer is 0.01 ppm or greater and 100 ppm or less.

12 Claims, 1 Drawing Sheet

(51) Int. Cl.
*B29C 49/00* (2006.01)
*B65D 1/02* (2006.01)
*B65D 65/40* (2006.01)
*C08L 23/08* (2006.01)
B29K 23/00 (2006.01)
B29K 105/00 (2006.01)
B29L 31/00 (2006.01)

(56) References Cited

FOREIGN PATENT DOCUMENTS

| | | |
|---|---|---|
| CN | 102906186 | 1/2013 |
| JP | 5-255554 A | 10/1993 |
| JP | 2001-234008 A | 8/2001 |
| JP | 3884367 | 6/2004 |
| JP | 2004-269725 A | 9/2004 |
| JP | 2007-31725 A | 2/2007 |
| JP | 2009-242645 | 10/2009 |
| JP | 2010-241863 | 10/2010 |
| WO | 2 005/01 471 | 2/2005 |
| WO | 2005/105437 A1 | 11/2005 |
| WO | 2006/022256 A1 | 3/2006 |
| WO | WO 2011/125736 | 10/2011 |

BLOW-MOLDED CONTAINER, FUEL CONTAINER, BLOW-MOLDED BOTTLE CONTAINER, AND PRODUCTION METHOD OF BLOW-MOLDED CONTAINER

TECHNICAL FIELD

The present invention relates to a blow-molded container, a fuel container, a blow-molded bottle container, and a production method of the blow-molded container.

BACKGROUND ART

Ethylene-vinyl alcohol copolymers (hereinafter, may be abbreviated as "EVOH(s)") are polymeric materials that are superior in gas barrier properties against gases such as oxygen, oil resistance, antistatic properties, and the like. Thus, EVOH-containing resin compositions are molded into containers, films, sheets and the like, which have been widely used as blow-molded containers such as fuel containers and bottle containers as well as packaging materials, etc. In particular, as the blow-molded containers, multilayer structures have been widely employed which include: a layer formed of the EVOH-containing resin composition; a thermoplastic resin layer that is superior in moisture resistance, impact resistance, etc.; and the like.

In the production of the blow-molded containers, melt molding is generally conducted; however, the melt molding may result in impaired appearance of the molded articles through generation of defects such as gelation (dirt under paint) and streaks. In addition, the gelation and the like not only lead to impairment of the appearance of the molded articles, but also cause deterioration of performances; therefore, inhibition of these events is needed.

Furthermore, in the step of manufacturing blow-molded containers, an operation of the melt molding apparatus must be stopped once and restarted after a certain time period for a change of the resin, a halt in manufacture on weekends, etc., as well as a replacement operation of the molding die, and the like. In these instances, a small amount of the resin composition remaining in the melt molding apparatus may be deteriorated during the steps of elevation and lowering of the temperature of the apparatus, and gelled upon restarting, leading to the occurrence of a disadvantage of causing deterioration of appearance and qualities such as strength of the molded articles. Thus, after the restarting of the apparatus, it is necessary to conduct idling for a certain time period to await until such gels and the like is no longer generated and the appearance of the molded articles is reverted to the normal state. In light of the production cost, the time period required for the reverting is preferably short, in other words, a self-purge feature is preferably favorable; however it is impossible to conclude that the self-purge feature of conventional EVOH-containing resin compositions is favorable.

Therefore, as EVOH-containing resin compositions having an improved self-purge feature, (1) a resin composition prepared by adding a polyolefin resin, a carboxylic acid-modified polyolefin resin and an alkaline earth metal salt of a lower fatty acid having 9 or less carbon atoms to an EVOH resin at a specific ratio (see Japanese Unexamined Patent Application, Publication No. H5-255554), and (2) an EVOH-containing resin composition containing a carboxylic acid having a certain viscosity and a molecular weight of less than 75, and an alkaline earth metal salt at a specific ratio (see Japanese Unexamined Patent Application, Publication No. 2001-234008) have been known. However, due to containing the alkaline earth metal, these EVOH-containing resin compositions may cause coloring of the molded articles, and also the self-purge feature thereof is not satisfactory. In particular, the aforementioned EVOH-containing resin composition (1) is disadvantageous in that deterioration of the hue and impairment of the long-time operation properties, i.e., minimization of generation of the defects even in melt molding over a long time period (long-run workability), may occur, owing to the addition of the polyolefin resin. Additionally, an odor in molding must be taken into consideration from an environmental viewpoint.

PRIOR ART DOCUMENTS

Patent Documents

Patent Document 1: Japanese Unexamined Patent Application, Publication No. H5-255554
Patent Document 2: Japanese Unexamined Patent Application, Publication No. 2001-234008
Patent Document 3: Japanese Unexamined Patent Application, Publication No. 2007-31725

SUMMARY OF THE INVENTION

Problems to be Solved by the Invention

The present invention was made in view of the foregoing circumstances, and it is an object of the present invention to provide a blow-molded container exhibiting inhibited coloring, odor, and generation of defects such as gelation and streaks which are caused on melt molding, and having a superior appearance. Moreover, it is another object of the present invention to provide a blow-molded container that has a favorable self-purge feature in production and satisfactory qualities such as strength, and can be produced at low cost.

Means For Solving The Problems

According to an aspect of the invention made for solving the aforementioned problems, a blow-molded container includes a first layer (hereinafter, may be also referred to as "layer (1)") containing an ethylene-vinyl alcohol copolymer (I), wherein the layer (1) contains a saturated carbonyl compound (II) having 3 to 8 carbon atoms, the saturated carbonyl compound (II) is a saturated aldehyde (II-1), a saturated ketone (II-2) or a combination thereof, and the content of the saturated carbonyl compound (II) in the layer (1) is 0.01 ppm or greater and 100 ppm or less.

Due to including the layer (1) containing the saturated carbonyl compound (II) in the amount falling within the specified range, the blow-molded container can exhibit the inhibited coloring, odor, and generation of defects such as gelation and streaks which are caused on melt molding, and consequently has a superior appearance. In addition, due to the layer (1) containing the specified amount of the saturated carbonyl compound (II), a superior self-purge feature is also exhibited in the production process of the blow-molded container, and accordingly the production cost of the blow-molded container can be reduced.

The saturated aldehyde (II-1) is more preferably propanal, butanal, hexanal or a combination thereof. The saturated ketone (II-2) is more preferably acetone, methyl ethyl ketone, 2-hexanone or a combination thereof. When the layer (1) thus contains the specified saturated carbonyl compound (II), the coloring, the odor, and the generation of defects such as gelation and streaks which are caused on melt molding can be more effectively inhibited, and consequently the appearance can be more improved. In addition, when the layer (1) contains the specified saturated carbonyl compound (II), a more superior self-purge feature is also exhibited, and consequently the production cost of the blow-molded container can be further reduced.

It is preferred that the layer (1) contains a conjugated polyene compound and the content of the conjugated polyene compound is 0.01 ppm or greater and 1,000 ppm or less.

When the layer (1) thus further contains the specified amount of the conjugated polyene compound, the coloring, the odor, the generation of defects such as gelation, etc. can be further reduced owing to the inhibition of oxidative degradation during the melt molding, and consequently the appearance can be further improved. In addition, when the layer (1) contains the specified amount of the conjugated polyene compound, a more superior self-purge feature is also exhibited, and consequently the production cost of the blow-molded container can be further reduced.

The conjugated polyene compound is preferably sorbic acid, a sorbic acid salt or a combination thereof. When sorbic acid, the sorbic acid salt or a combination thereof is thus contained as the conjugated polyene compound, the oxidative degradation during the melt molding can be more effectively inhibited, and consequently the coloring, the odor, and the generation of defects such as gelation can be more effectively inhibited, leading to a further improvement of the appearance. Moreover, when the layer (1) contains sorbic acid, the sorbic acid salt or a combination thereof as the conjugated polyene compound, the occurrence of the gelation and the like can be inhibited even in continuous melt molding over a long time period, and thus a blow-molded container that is superior in impact resistance can be obtained.

The blow-molded container preferably further includes: a pair of second layers (hereinafter, each layer may be also referred to as "layer (2)") that are formed of a thermoplastic resin having a solubility parameter calculated using the Fedors equation of 11 $(cal/cm^3)^{1/2}$ or less and are arranged on the inner face side and the outer face side of the layer (1), respectively; and a pair of third layers (hereinafter, each layer may be also referred to as "layer (3)") that are formed of a carboxylic acid-modified polyolefin and are each arranged between the layer (1) and the layer (2).

When the blow-molded container further includes the layers (2) and the layers (3) in addition to the layer (1), the gas barrier properties, the oil resistance, the impact resistance and the like of the blow-molded container under high humidity can be improved.

The blow-molded container preferably includes a fourth layer (hereinafter, may be also referred to as "layer (4)") containing the ethylene-vinyl alcohol copolymer (I), the thermoplastic resin and the carboxylic acid-modified polyolefin.

When the blow-molded container further includes the layer (4), the gas barrier properties, the impact resistance and the like under high humidity can be more improved.

The layer (4) is preferably formed using a recovered material from the layer (1), the layer (2) and the layer (3) in the production process of the blow-molded container. In a case where the layer (4) is formed using the recovered material from the layer (1), the layer (2) and the layer (3) in the production process of the blow-molded container, burrs generated in the production process of the blow-molded container, products failed an inspection, etc. can be recycled for the layer (4), whereby the material resins can be utilized with a less amount of waste, and a cost reduction can be enhanced.

According to the blow-molded container, it is preferred that the average thickness of the layer (1) accounts for 5.0% or less of the average entire layer thickness, and that the content of the ethylene-vinyl alcohol copolymer (I) in the layer (4) is 9.0% by mass or less. In the blow-molded container, when the average thickness of the layer (1) accounts for 5.0% or less of the average entire layer thickness and the content of the ethylene-vinyl alcohol copolymer (I) in the layer (4) is 9.0% by mass or less, the impact resistance can be more improved while superior gas barrier properties, oil resistance, appearance, self-purge feature and the like are maintained.

The blow-molded container can be suitably used as a fuel container. Since the blow-molded container is superior in gas barrier properties, oil resistance and the like, and also has a superior appearance, the blow-molded container can be suitably used as the fuel container.

Also, the blow-molded container can be suitably used as a blow-molded bottle container. Since the blow-molded bottle container is also superior in appearance, gas barrier properties, oil resistance and the like, the blow-molded bottle container can be suitably used as a bottle container for foods, cosmetics, etc.

In addition, a preferred production method of the blow-molded container according to the aspect of the present invention includes the step of blow-molding using a resin composition containing the ethylene-vinyl alcohol copolymer (I), wherein the resin composition contains the saturated carbonyl compound (II) having 3 to 8 carbon atoms, the saturated carbonyl compound (II) is the saturated aldehyde (II-1), the saturated ketone (II-2) or a combination thereof, and the content of the saturated carbonyl compound (II) in the resin composition is 0.01 ppm or greater and 100 ppm or less. According to the production method of the blow-molded container, the coloring, the odor, and the generation of defects such as gelation and streaks can be inhibited, and consequently a blow-molded container having a superior appearance can be obtained. In addition, the resin composition used in the production method of the blow-molded container has a superior self-purge feature, and accordingly the production cost can be reduced.

Effects Of The Invention

Since the blow-molded container according to the aspect of the present invention exhibits satisfactory gas barrier properties and oil resistance which are characteristics of the EVOH, and additionally contains the specified amount of the saturated carbonyl compound (II) in the layer (1), the coloring, the odor, and the generation of defects such as gelation and streaks which are caused on melt molding are inhibited, and accordingly the blow-molded container has a superior appearance. Moreover, according to the blow-molded container, due to the layer (1) containing the specified amount of the saturated carbonyl compound (II), a superior self-purge feature is also exhibited in a production process, and accordingly the production cost of the blow-molded container can be reduced. Thus, the blow-molded container can be used in a variety of intended usages, and in particular, can be suitably used as a fuel container.

DESCRIPTION OF EMBODIMENTS

Hereinafter, embodiments of the present invention will be described with reference to the drawing. However, the present invention is by no means limited to the following embodiments. In addition, with respect to materials exemplified in the following, one type of the materials may be used alone, or two or more types thereof may be used in combination, unless otherwise specified particularly.

Blow-Molded Container

Figure 1:
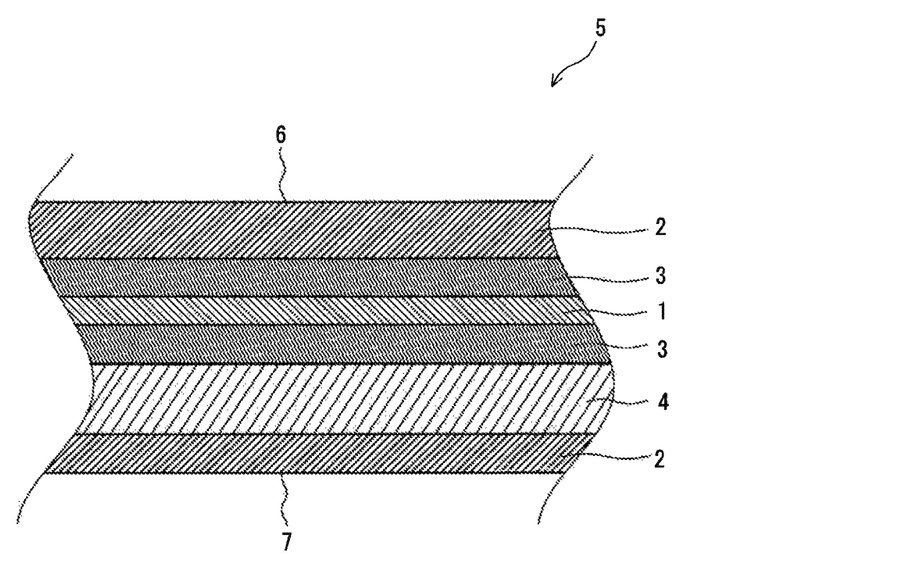
FIG. 1 shows a schematic partial cross sectional view illustrating one embodiment of the blow-molded container according to the present invention.

The blow-molded container 5 shown in FIG. 1 includes:

(1) a layer 1 containing an ethylene-vinyl alcohol copolymer (I);

(2) a pair of layers 2 that are formed of a thermoplastic resin having a solubility parameter calculated using the Fedors equation of 11 $(\text{cal/cm}^3)^{1/2}$ or less and are arranged on the inner face side and the outer face side of the layer (1), respectively;

(3) a pair of layers 3 that are formed of a carboxylic acid-modified polyolefin and are each arranged between the layer (1) and the layer (2); and (4) a layer 4 containing the ethylene-vinyl alcohol copolymer (I), the thermoplastic resin having a solubility parameter calculated using the Fedors equation of 11 $(\text{cal/cm}^3)^{1/2}$ or less, and the carboxylic acid-modified polyolefin. Specifically, the blow-molded container 5 has a multilayer structure in which the layer (2) 2, the layer (3) 3, the layer (1) 1, the layer (3) 3, the layer (4) 4, and the layer (2) 2 are laminated in this order from the container inner surface 6 toward the container outer surface 7. The overall average thickness of the blow-molded container 5 is preferably 300 to 10,000 μm, more preferably 500 to 8,500 μm, and still more preferably 1,000 to 7,000 μm. It is to be noted that the overall average thickness means an average thickness in the body part of the blow-molded container 5. When the overall average thickness is too great, a weight may increase, and for example, in the case of the use of the blow-molded container 5 in a fuel container of an automobile and the like, adverse effects on fuel consumption may be caused, and the cost of the container may also be increased. On the other hand, when the overall average thickness is too small, the rigidity of the blow-molded container 5 may not be maintained, leading to easy breakage of the blow-molded container 5. Therefore, it is important to select the thickness in accordance with the volume and intended usages thereof. It is to be noted that FIG. 1 shows a partial cross-sectional view of the peripheral wall of the blow-molded container 5. Hereinafter, each layer will be described.

Layer (1) (First Layer)

The layer (1) 1 contains the EVOH (I) as a principal component, and contains a saturated carbonyl compound (II) at a content of 0.01 ppm or greater and 100 ppm or less. Since the blow-molded container 1 includes the layer (1) 1 that contains the specified amount of the saturated carbonyl compound (II), the coloring, the odor, and the generation of defects such as gelation and streaks which are caused on melt molding can be inhibited, and thus the blow-molded container 1 has a superior appearance. In addition, due to the layer (1) 1 containing the specified amount of the saturated carbonyl compound (II), a superior self-purge feature in the production process of the blow-molded container 5 is also exhibited, and accordingly the production cost can be reduced. Moreover, the layer (1) 1 preferably further contains a conjugated polyene compound. Furthermore, the layer (1) 1 may contain a boron compound, acetic acid, a phosphorus compound, and/or other optional component within a range not leading to impairment of the effects of the present invention. The "principal component" as referred to means a component included at the greatest content on mass basis. As used herein, "ppm" as referred to means a mass proportion of a pertinent component in each layer, and 1 ppm means 0.0001% by mass. The "content of a boron compound" means a content as a mass in terms of boric acid equivalent. The "content of an acetic acid salt" means a content as a mass in terms of acetic acid equivalent. The "content of a phosphorus compound" means a content as a mass in terms of phosphorus element equivalent. Hereinafter, each component is explained in detail.

EVOH (I)

EVOH (I) is an ethylene-vinyl alcohol copolymer obtained by saponifying a copolymer of ethylene and a vinyl ester. The vinyl ester is exemplified by vinyl acetate, vinyl propionate, vinyl pivalate, and the like, and vinyl acetate is preferred. These vinyl esters may be used either alone, or two or more types thereof may be used in combination.

The EVOH (I) may have other structural unit derived from a monomer other than ethylene and the vinyl ester. Such a monomer is exemplified by polymerizable compounds, e.g.: vinylsilane compounds; unsaturated hydrocarbons such as propylene and butylene; unsaturated carboxylic acids such as (meth)acrylic acid; vinylpyrrolidones such as N-vinylpyrrolidone; and the like. The content of the other structural unit is preferably 0.0002 mol % or greater and 0.2 mol % or less with respect to the total structural units of the EVOH (I).

The ethylene content of the EVOH (I) is typically 20 mol % or greater and 45 mol % or less. The lower limit of the ethylene content is preferably 24 mol %, and more preferably 27 mol %. The upper limit of the ethylene content is preferably 42 mol %, and more preferably 38 mol %. When the ethylene content is less than the lower limit, thermal stability of the EVOH (I) in the melt extrusion may be deteriorated, leading to ease of gelation, and consequently defects such as gelation and streaks are likely to be generated. In particular, an operation is made for a long time period under conditions involving a higher temperature or a higher speed than those for general melt extrusion, the gelation is highly likely to occur. On the other hand, when the ethylene content is greater than the upper limit, the gas barrier properties of the EVOH (I) may be deteriorated, and the advantageous characteristics of the EVOH (I) may not be sufficiently exhibited.

The degree of saponification of the structural unit derived from the vinyl ester in the EVOH (I) is typically 85% or greater, preferably 90% or greater, more preferably 98% or greater, and still more preferably 99% or greater. When the degree of saponification is less than 85%, insufficient thermal stability may be caused.

The content of the EVOH (I) in the layer (1) 1 is typically 95% by mass or greater, preferably 98.0% by mass or greater, more preferably 99.0% by mass or greater, and still more preferably 99.5% by mass or greater. When the content of the EVOH (I) falls within the specified range, the blow-molded article exhibits superior gas barrier properties, oil resistance, and the like.

Saturated Carbonyl Compound (II)

The saturated carbonyl compound (II) is any one of the saturated aldehyde (II-1) and the saturated ketone (II-2), or a combination thereof. Due to including the layer (1) containing the saturated carbonyl compound (II) in the amount falling within the specified range, the blow-molded container can exhibit the inhibited coloring, odor, and generation of defects such as gelation and streaks which are caused on melt molding, and has a superior appearance. In addition, due to the layer (1) containing the specified amount of the saturated carbonyl compound (II), a superior self-purge feature is also exhibited in a production process of the blow-molded container, and accordingly the production cost of the blow-molded container can be reduced. The "saturated carbonyl compound (II)" as referred to herein means a compound that does not include an unsaturated bond in a moiety other than the carbonyl group.

The saturated aldehyde (II-1) as referred to means an aldehyde that does not include an unsaturated bond in a moiety other than the aldehyde group in a molecule thereof. The saturated aldehyde (II-1) may be a linear aldehyde, a branched aldehyde, or an aldehyde having a ring structure in a molecule thereof as long as the saturated aldehyde (II-1) does not include an unsaturated bond in the moiety other than the aldehyde group. The saturated aldehyde (II-1) may have one, or two or more aldehyde groups in a molecule thereof. The saturated aldehyde (II-1) is exemplified by a saturated aliphatic aldehyde and the like.

Examples of the saturated aliphatic aldehyde include propanal, butanal, pentanal, hexanal, heptanal, octanal, cyclohexanecarbaldehyde, cyclopentanecarbaldehyde, methylcyclohexanecarbaldehyde, methylcyclopentylaldehyde, and the like.

The saturated ketone (II-2) may be a linear ketone, a branched ketone, or a ketone having a ring structure in a molecule thereof as long as the saturated ketone (II-2) does not include an unsaturated bond in the moiety other than the carbonyl group. The saturated ketone (II-2) may have one, or two or more carbonyl groups in a molecule thereof. The saturated ketone (II-2) is exemplified by a saturated aliphatic ketone, a saturated cyclic ketone, and the like.

Examples of the saturated aliphatic ketone include acetone, methyl ethyl ketone, 2-pentanone, 3-pentanone, 3-methyl-2-butanone, 2-hexanone, 3-hexanone, 4-methyl-2-pentanone, 2-methyl-3-pentanone, 3,3-dimethyl-2-butanone, 2-heptanone, 3-heptanone, 4-heptanone, 4-methyl-2-hexanone, 5-methyl-2-hexanone, 2,4-dimethyl-3-pentanone, 2-octanone, 3-methyl-2-heptanone, 5-methyl-3-heptanone, 3-octanone, 6-methyl-2-heptanone, 2,6-dimethyl-4-heptanone, methyl cyclopentyl ketone, methyl cyclohexyl ketone, and the like. Examples of the saturated cyclic ketone include cyclobutanone, cyclopentanone, cyclohexanone, cycloheptanone, cyclooctanone, and the like. The saturated carbonyl compound (II) preferably has 3 to 50 carbon atoms, more preferably 3 to 15 carbon atoms, and still more preferably 3 to 8 carbon atoms in light of an improvement of the solubility of the saturated carbonyl compound (II) in water.

In light of more sufficient inhibition of the generation of defects such as gelation and streaks which are caused on melt molding and the like, and in light of a more superior appearance, the saturated aldehyde (II-1) is preferably propanal, butanal, hexanal or a combination thereof, and more preferably propanal, among the saturated aldehydes exemplified.

In light of more sufficient inhibition of the generation of defects such as gelation and streaks which are caused on melt molding and the like, and in light of a more superior appearance, the saturated ketone (II-2) is preferably a saturated aliphatic ketone, more preferably acetone, methyl ethyl ketone, 2-hexanone or a combination thereof, and still more preferably acetone, among the saturated ketones exemplified.

According to the saturated carbonyl compound (II), a part or all of hydrogen atoms thereof may be substituted with a substituent, within a range not leading to impairment of the effects of the present invention. The substituent is exemplified by a halogen atom, a hydroxy group, an amino group, an amide group, a cyano group, and the like.

The lower limit of the content of the saturated carbonyl compound (II) in the layer (1) 1 is 0.01 ppm, preferably 0.05 ppm, more preferably 0.1 ppm, still more preferably 0.15 ppm, and particularly preferably 0.2 ppm. The upper limit of the content of the saturated carbonyl compound (II) is 100 ppm, preferably 95 ppm, more preferably 50 ppm, still more preferably 30 ppm, and particularly preferably 20 ppm. According to the blow-molded container 5, when the content of the saturated carbonyl compound (II) in the layer (1) 1 is less than the lower limit, the effects exerted by the incorporation of the saturated carbonyl compound (II), for example, the inhibition of the coloring and the generation of the defects may not be satisfactorily achieved. On the other hand, when the content of the saturated carbonyl compound (II) is greater than the upper limit, the saturated carbonyl compound (II) may cause a crosslinking effect in melt molding, and the occurrence of gelation may be induced, leading to an insufficient appearance. The "content of the saturated carbonyl compound (II) in the layer (1) 1 as referred to means a value obtained by the quantitative determination of the saturated carbonyl compound (II) contained in a dry resin composition obtained by drying the resin composition containing the EVOH (hereinafter, may be also referred to as "EVOH-containing resin composition") which constitutes the layer (1) 1.

Conjugated Polyene Compound

The conjugated polyene compound inhibits oxidative degradation in melt molding. The "conjugated polyene compound" as referred to herein means a compound having a conjugated double bond, as generally referred to, i.e., a compound having two or more carbon-carbon double bonds and a structure in which a carbon-carbon double bond and a carbon-carbon single bond are alternately connected. The conjugated polyene compound may be a conjugated diene including two double bonds involved in the conjugation, a conjugated triene including three double bonds involved in the conjugation, or a conjugated polyene including four or more double bonds involved in the conjugation. In addition, the conjugated double bond may be present in a multiple number in a single molecule without being conjugated with one another. For example, compounds having three conjugated triene structures in a single molecule, such as tung oil, may also be included in the conjugated polyene compound.

The conjugated polyene compound preferably has 7 or less conjugated double bonds. When the layer (1) 1 contains a conjugated polyene compound having 8 or more conjugated double bonds, the coloring of the blow-molded container 5 is likely to occur.

The conjugated polyene compound may be used either alone, or two or more types thereof may be used in combination. Of these, sorbic acid, a sorbic acid ester, a sorbic acid salt, myrcene or a mixture of any of these is preferred, and sorbic acid, sorbic acid salts (sodium sorbate, potassium sorbate, or the like) or a mixture thereof is more preferred. Sorbic acid, the sorbic acid salt and a mixture thereof exhibit superior inhibitory effects on oxidative degradation at high temperatures, and are preferred also in light of hygienic properties and availability since they are industrially used broadly also as food additives.

The molecular weight of the conjugated polyene compound is typically 1,000 or less, preferably 500 or less, and more preferably 300 or less. When the molecular weight of the conjugated polyene compound is greater than 1,000, the state of dispersion of the conjugated polyene compound in the EVOH (I) may be inferior, and the appearance after the melt molding may be unfavorable.

The lower limit of the content of the conjugated polyene compound in the layer (1) 1 is preferably 0.01 ppm, more preferably 0.5 ppm, and still more preferably 1 ppm. The upper limit of the content is preferably 1,000 ppm, more preferably 800 ppm, and still more preferably 500 ppm. According to the blow-molded container 5, when the content of the conjugated polyene compound in layer (1) 1 is less than the lower limit, inhibitory effects on oxidative degradation in the melt molding may not be satisfactorily achieved, and gelation may occur. On the other hand, when the content of the conjugated polyene compound is greater than the upper limit, the occurrence of the gelation may be facilitated, and the appearance of the blow-molded container 5 may be deteriorated.

Boron Compound

The boron compound inhibits gelation in the melt molding, and additionally inhibits a torque fluctuation of an extrusion molding machine or the like, i.e., a variation of a viscosity during heating. In addition, when the layer (1) 1 further contains the boron compound, a further superior self-purge feature may be exhibited in production, and consequently the production can be executed at further low cost. Examples of the boron compound include:

boric acids such as orthoboric acid, metaboric acid and tetraboric acid;

boric acid esters such as triethyl borate and trimethyl borate;

boric acid salts such as alkali metal salts and alkaline earth metal salts of the aforementioned boric acids, and borax;

boron hydrides; and the like. Of these, the boric acids are preferred, and orthoboric acid (hereinafter, may be also referred to as "boric acid") is more preferred. The lower limit of the content of the boron compound in the layer (1) 1 is preferably 100 ppm, and more preferably 150 ppm. The upper limit of the content of the boron compound is preferably 5,000 ppm, more preferably 4,000 ppm, and still more preferably 3,000 ppm. When the content of the boron compound is less than the lower limit, a torque fluctuation of an extrusion molding machine or the like may not be sufficiently inhibited. On the other hand, when the content of the boron compound is greater than the upper limit, gelation is likely to occur during the melt molding, the appearance of the blow-molded container 5 may be deteriorated.

Acetic Acid

Acetic acid prevents the coloring of the blow-molded container 5 and the gelation during melt molding. The lower limit of the content of acetic acid in the layer (1) 1 is preferably 100 ppm, more preferably 150 ppm, and still more preferably 200 ppm. The upper limit of the content of acetic acid is preferably 1,000 ppm, more preferably 500 ppm, and still more preferably 400 ppm. When the content of acetic acid is less than the lower limit, sufficient coloring-preventive effects may not be achieved, yellowing may occur in the blow-molded container 5. On the other hand, when the content of acetic acid is greater than the upper limit, the gelation is likely to occur in the melt molding, in particular, in melt molding over a long time period, and consequently the appearance of the blow-molded container 5 may be deteriorated. It is further preferred that an acetic acid salt (sodium acetate, potassium acetate, or the like) may be used in combination.

Phosphorus Compound

The phosphorus compound further inhibits the coloring, the odor, and the generation of defects such as gelation, thereby improving the appearance of the molded article. Examples of the phosphorus compound include phosphoric acid, phosphorous acid, phosphates, and the like. The phosphate may be in any form of a monobasic phosphate salt, a dibasic phosphate salt and a tribasic phosphate salt. In addition, the cationic species contained in the phosphate is not particularly limited, and alkali metal salts, and alkaline earth metal salts are preferred. Of these, sodium dihydrogen phosphate, potassium dihydrogen phosphate, disodium hydrogen phosphate, and dipotassium hydrogen phosphate are more preferred, and sodium dihydrogen phosphate, and dipotassium hydrogen phosphate are still more preferred. The lower limit of the content of the phosphorus compound in the layer (1) 1 is preferably 2 ppm, more preferably 3 ppm, and still more preferably 5 ppm. The upper limit of the content of the phosphorus compound is preferably 200 ppm, more preferably 150 ppm, and still more preferably 100 ppm. When the content of the phosphorus compound is less than the lower limit, or when the content of the phosphorus compound is greater than the upper limit, the thermal stability may be deteriorated, and the coloring and the occurrence of gelation are likely to occur in the melt molding over a long time period.

Other Optional Component

The layer (1) 1 may contain other optional component, within a range not leading to impairment of the effects of the present invention. The other optional component is exemplified by an alkali metal, an antioxidant, an UV absorbent, a plasticizer, an antistatic agent, a lubricant, a colorant, a filler, a heat stabilizer, other resin, and the like. The resin composition may contain two or more types of these optional components, and the total content of the optional component is preferably 1% by mass or less with respect to the layer (1) 1.

In order to inhibit the gelation, for example, a hindered phenol compound or a hindered amine compound, a hydrotalcite compound or the like may be added. These may be used either alone, or two or more types thereof may be used in combination. The amount of the compound added to inhibit the gelation is typically 0.01% by mass or greater and 1% by mass or less.

Preparation Method of EVOH-Containing Resin Composition

The layer (1) 1 can be formed from the EVOH-containing resin composition that contains each component. The production method of the EVOH-containing resin composition is not particularly limited as long as the saturated carbonyl compound (II) can be homogeneously blended into the EVOH (I), and the saturated carbonyl compound (II) at a content of 0.01 ppm or greater and 100 ppm or less can be contained in the finally obtained layer (1) 1; however, the production method of the EVOH-containing resin composition is preferably exemplified by a production method including: (1) the step of copolymerizing ethylene with a vinyl ester (hereinafter, may be also referred to as "step (1)"); and (2) the step of saponifying the copolymer obtained in the step (1) (hereinafter, may be also referred to as "step (2)"), in which the saturated carbonyl compound (II) at a content of 0.01 ppm or greater and 100 ppm or less is incorporated into the resin composition.

The procedure for incorporating the specified amount of the saturated carbonyl compound (II) into the resin composition is not particularly limited, and is exemplified by:

a procedure in which the specified amount of the saturated carbonyl compound (II) is added in the step (1);

a procedure in which the specified amount of the saturated carbonyl compound (II) is added in the step (2);

a procedure in which the specified amount of the saturated carbonyl compound (II) is added to the EVOH obtained in the step (2); and the like. However, when the procedure in which the specified amount of the saturated carbonyl compound (II) is added in the step (1), or the procedure in which the specified amount of the saturated carbonyl compound (II) is added in the step (2) is employed, in order to incorporate a desired amount of the saturated carbonyl compound (II) into the resulting resin composition, it is necessary to increase the amount of the added saturated carbonyl compound (II) taking into consideration the amount of the saturated carbonyl compound (II) consumed in the polymerization reaction in the step (1) and/or the saponification reaction in the step (2), and consequently these reactions may be inhibited. In addition, since the amount of the saturated carbonyl compound (II) consumed in the polymerization reaction and/or the saponification reaction may vary depending on reaction conditions, it would be difficult to regulate the content of the saturated carbonyl compound (II) in the resin composition. Therefore, the procedure in which the specified amount of the saturated carbonyl compound (II) is added, after the step (2), to the EVOH (I) obtained in the step (2) is preferred.

The procedure for adding the specified amount of the saturated carbonyl compound (II) to the EVOH may be exemplified by: a procedure in which a blend of the saturated carbonyl compound (II) with the EVOH prepared beforehand is pelletized; a procedure in which a strand obtained by deposition of a paste after the saponification of the ethylene-vinyl ester copolymer is impregnated with the saturated carbonyl compound (II); a procedure in which a strand obtained by deposition is impregnated with the saturated carbonyl compound (II) after cutting the strand; a procedure in which the saturated carbonyl compound (II) is added to a solution of redissolved chips of a dry resin composition; a procedure in which a blend of two components of the EVOH (I) and the saturated carbonyl compound (II) is melt-kneaded; a procedure in which the saturated carbonyl compound (II) is fed to be contained in a melt of the EVOH (I) during extrusion; a procedure in which a masterbatch is produced by blending a high concentration of the saturated carbonyl compound (II) with a part of the EVOH (I) and pelletizing the blend, and the masterbatch is dry-blended with the EVOH (I) to give a mixture which is then melt-kneaded; and the like.

Of these, as the saturated carbonyl compound (II)-mixing procedure, the procedure in which a blend of the saturated carbonyl compound (II) with EVOH (I) prepared beforehand is pelletized is preferred in light of a possibility of homogeneously dispersing a slight amount of the saturated carbonyl compound (II) in the EVOH (I). Specifically, the addition of the saturated carbonyl compound (II) is preferably carried out according to a procedure in which the saturated carbonyl compound (II) is added to a solution prepared by dissolving the EVOH (I) in a good solvent such as a mixed solvent of water and methanol, and thus resulting mixture solution is extruded into a poor solvent through a nozzle or the like to permit deposition and/or coagulation, followed by washing and/or drying the same. In this procedure, the pellets of the EVOH (I) containing the saturated carbonyl compound (II) homogeneously mixed therewith can be obtained.

The procedure for incorporating each component other than the saturated carbonyl compound (II) into the layer (1) 1 is exemplified by: a procedure in which the pellets are mixed with each component, followed by melt-kneading; a procedure in which each component is mixed together with saturated carbonyl compound (II) in preparing the pellets; a procedure in which the pellets are immersed in a solution containing each component; and the like. It is to be noted that a ribbon blender, a high speed mixer, a cokneader, a mixing roll, an extruder, an intensive mixer and the like may be employed for the mixing.

When the sum of thicknesses of layer(s) to be arranged on the inner side with respect to the layer (1) 1 is designated as "I", and the sum of thicknesses of layer(s) to be arranged on the outer side with respect to the layer (1) 1 is designated as "O", the thickness ratio (I/O) is preferably 1/99 to 70/30, more preferably 1/99 to 55/45, and still more preferably 30/70 to 55/45. It is to be noted that the thickness of the entire layer or each layer of the blow-molded container 5 was determined through an observation using an optical microscope on samples obtained by cutting with a microtome away from a container at a plurality of points of the body part thereof to give cross sections, and then an average of the entire layer or each layer is calculated. The calculated value is designated as the average entire layer thickness or the average thickness of each layer. The average thickness of the layer (1) 1 is not particularly limited; in light of the barrier properties, the mechanical strength and the like, the average thickness of the layer (1) 1 accounts for preferably 5.0% or less, more preferably 0.5% to 5%, still more preferably 1.0% to 4.5%, and particularly preferably 1.5% to 4.0% of the average entire layer thickness.

Layer (2) (Second Layer)

The layer (2) 2 is formed of a thermoplastic resin having a solubility parameter calculated using the Fedors equation of 11 $(cal/cm^3)^{1/2}$ or less and is arranged on the inner face side and the outer face side of the layer (1) 1. The thermoplastic resin having the solubility parameter calculated using the equation of 11 $(cal/cm^3)^{1/2}$ or less exhibits superior moisture resistance. It is to be noted that the "solubility parameter calculated using the Fedors equation" as referred to means a value represented by $(E/V)^{1/2}$, wherein: E represents a molecular cohesive energy (cal/mol), and expressed by the equation of $E=\Sigma ei$, wherein ei represents an evaporation energy; and V represents a molecular volume $(cm^3/mol)$ and expressed by the equation of $V=\Sigma vi$, wherein vi represents a molar volume.

The thermoplastic resin contained in the layer (2) 2 is not particularly limited as long as the thermoplastic resin has a solubility parameter of 11 $(cal/cm^3)^{1/2}$ or less, and examples thereof include: homopolymers or copolymers of an olefin, such as polyethylenes (linear low density polyethylenes, low density polyethylenes, medium-density polyethylenes, high-density polyethylenes, etc.), ethylene-vinyl acetate copolymers, ethylene-propylene copolymers, polypropylenes, copolymers of propylene with α-olefin having 4 to 20 carbon atoms, polybutenes and polypentenes; polystyrenes; polyvinyl chlorides; polyvinylidene chlorides; acrylic resins; vinyl ester-based resins; polyurethane elastomers; polycarbonates; chlorinated polyethylenes; chlorinated polypropylenes; and the like, all of which have a solubility parameter of 11 $(cal/cm^3)^{1/2}$ or less. Of these, polyethylenes, ethylene-propylene copolymers, ethylene-vinyl acetate copolymers, polypropylenes and polystyrenes are preferred, and high-density polyethylenes are more preferred.

In light of rigidity, impact resistance, moldability, drawdown resistance, gasoline resistance and the like, the density of the high-density polyethylene is preferably 0.93 g/cm$^3$ or greater, more preferably 0.95 g/cm$^3$ or greater and 0.98 g/cm$^3$ or less, and still more preferably 0.96 g/cm$^3$ or greater and 0.98 g/cm$^3$ or less. Moreover, the melt flow rate (MFR) of the high-density polyethylene under a load of 2,160 g at 190° C. falls within the range of preferably 0.01 g/10 min to 0.5 g/10 min, and more preferably 0.01 g/10 min to 0.1 g/10 min.

It is to be noted that the high-density polyethylene used may be appropriately selected, in general, from among commercially available products. In addition, the layer (2) 2 may contain other optional component similar to those which may be contained in the layer (1) 1, within a range not leading to impairment of the effects of the present invention. The average thickness of layer (2) 2 is not particularly limited, and the average thickness of layer (2) 2 accounts for preferably 5% to 70%, more preferably 8% to 60%, and still more preferably 10% to 50% of the average entire layer thickness.

Layer (3) (Third Layer)

The layer (3) 3 is formed of a carboxylic acid-modified polyolefin and is arranged between the layer (1) 1 and the layer (2) 2. The layer (3) 3 may function as an adhesion layer between the layer (1) 1 and other layer such as the layer (2) 2. It is to be noted that the carboxylic acid-modified polyolefin as referred to means an olefin-derived polymer having a carboxyl group or an anhydride group therefrom, which may be obtained by chemically binding an ethylenic unsaturated carboxylic acid or an anhydride therefrom to an olefin-derived polymer through an addition reaction, a graft reaction, or the like.

The ethylenic unsaturated carboxylic acid or an anhydride therefrom is exemplified by a monocarboxylic acid, a monocarboxylic acid ester, a dicarboxylic acid, a dicarboxylic acid monoester, a dicarboxylic acid diester, a dicarboxylic acid anhydride, and the like. Specific examples of the ethylenic unsaturated carboxylic acid or an anhydride therefrom include maleic acid, fumaric acid, itaconic acid, maleic anhydride, itaconic anhydride, maleic acid monomethyl ester, maleic acid monoethyl ester, maleic acid diethyl ester, fumaric acid monomethyl ester, and the like. Of these, dicarboxylic acid anhydrides such as maleic anhydride and itaconic anhydride are preferred, and maleic anhydride is more preferred.

Examples of the olefin-derived polymer which serves as a base polymer include:

polyolefins such as low-density, medium-density or high-density polyethylenes, linear low density polyethylenes, polypropylenes and polybutenes;

copolymers of an olefin with a comonomer copolymerizable with an olefin, e.g., a vinyl ester or an unsaturated carboxylic acid ester, such as ethylene-vinyl acetate copolymers and ethylene-ethyl acrylate copolymers; and the like. Of these, linear low density polyethylenes, ethylene-vinyl acetate copolymers having a vinyl acetate content of 5 to 55% by mass, and ethylene-ethyl acrylate copolymers having an ethyl acrylate content of 8 to 35% by mass are preferred, and linear low density polyethylenes and ethylene-vinyl acetate copolymers having a vinyl acetate content of 5 to 55% by mass are more preferred.

The carboxylic acid-modified polyolefin is obtained by introducing the ethylenic unsaturated carboxylic acid or the anhydride therefrom into the olefin-derived polymer in the presence of, for example, a solvent such as xylene and a catalyst such as a peroxide through an addition reaction or a graft reaction. In this procedure, the amount of addition or grafting of the carboxylic acid or the anhydride therefrom to the olefin-derived polymer (i.e., degree of modification) with respect to the olefin-derived polymer is preferably 0.01 to 15% by mass, and more preferably 0.02 to 10% by mass. The carboxylic acid-modified polyolefin may be used either alone of one type, or as a mixture of two or more thereof. It is to be noted that the layer (3) 3 may contain in addition to the carboxylic acid-modified polyolefin, other optional component similar to those which may be contained in the layer (1) 1, within a range not leading to impairment of the effects of the present invention. The average thickness of the layer (3) 3 is not particularly limited, and the average thickness of the layer (3) 3 accounts for preferably 0.3% to 12%, more preferably 0.6% to 9%, and still more preferably 1.2% to 6% of the average entire layer thickness. Too small thickness of the layer (3) 3 as an adhesive resin layer is not preferred in light of inferior adhesiveness of the layer (3) 3, and too great thickness of the layer (3) 3 is not preferred in light of an increase of the cost of the layer (3) 3.

Layer (4) (Fourth Layer)

The layer (4) 4 contains the EVOH (I), the thermoplastic resin, and the carboxylic acid-modified polyolefin. In addition, the layer (4) 4 is preferably formed using a recovered material from the layer (1) 1, the layer (2) 2 and the layer (3) 3 in the production process of the blow-molded container 5. Examples of the recovered material include burrs generated in the production process of the blow-molded container 5, products failed an inspection, and the like. When the blow-molded container 5 further includes the layer (4) 4 as the recovery layer, a loss of the resin used in the production of the blow-molded container 5 can be reduced through recycling of such burrs and/or products failed an inspection.

The layer (4) 4 may be used as a substitute for the layer (2) 2 described above. However, in general, the layer (4) 4 is preferably used after being laminated with the layer (2) 2 since the layer (4) 4 usually has lower mechanical strength than the layer (2) 2. Taking it into consideration that when the blow-molded container 5 is subjected to an external impact, concentration of stress would occur in the container, and in the stress concentration area, a compression stress in response to the impact would be generated on the inner layer side of the container, leading to breakage thereof, the layer (4) 4 which is weak in strength is preferably arranged so as to be situated on the outer side with respect to the layer (1) 1. Moreover, in a case where a large amount of the resin needs to be recycled, e.g., in the case of the generation of a large amount of the burr, the recovery layer as the layer (4) 4 may be arranged on both sides of the layer (1) 1. The content of the EVOH in the layer (4) 4 is preferably 9.0% by mass or less. When the content of the EVOH in the layer (4) 4 is greater than 9% by mass, a crack is likely to be generated at the interface between the layer (4) 4 and the layer (2) 2, and then the breakage of the entire blow-molded container 5 starting from the crack may occur. The average thickness of the layer (4) 4 is not particularly limited; the average thickness of the layer (4) 4 accounts for preferably 10% to 60%, more preferably 20% to 55%, and still more preferably 30% to 50% of the average entire layer thickness.

Production Method of Blow-Molded Container 5

The blow-molded container 5 is preferably produced according to a production method including the step of blow-molding using a resin composition containing the ethylene-vinyl alcohol copolymer (I), in which the resin composition contains a saturated carbonyl compound (II)

having 3 to 8 carbon atoms, the saturated carbonyl compound (II) is a saturated aldehyde (II-1), a saturated ketone (II-2) or a combination thereof, and the content of the saturated carbonyl compound (II) in the resin composition is 0.01 ppm or greater and 100 ppm or less. Specifically, the blow-molding is carried out using dry EVOH-containing resin composition pellets for forming the layer (1) 1, the high-density polyethylene resin or the like for forming the layer (2) 2, the adhesive resin for forming the layer (3) 3, the recovered resin for forming the layer (4) 4, and the like, in a blow-molding machine at a temperature of 100° C. to 400° C. from, for example, a parison of 6 layers involving 4 types, i.e., 2/3/1/3/4/2, from the inside to the outside, and then cooling at an internal temperature of the die of 10° C. to 30° C. for 10 sec to for 30 min, enabling molding of a hollow container having the average entire layer thickness of 300 µm to 10,000 µm.

Other Embodiment

The blow-molded container according to the present invention is not limited to the embodiment shown in FIG. 1, and any blow-molded container is acceptable as long as at least layer (1) is provided. Specifically, the layer (4) as the recovery layer, and the like may not be provided. Furthermore, other layer may also be laminated. In addition, by selecting a combination of resins that provide favorable adhesiveness, the layer (3) as the adhesion layer may be omitted.

When the layer (2) is provided, the layer (2) is preferably provided as the outermost layer. In other words, providing the layer (2)/layer (3)/layer (1)/layer (3)/layer (2) from the container inner surface toward the container outer surface (hereinafter, represented by, e.g., 2/3/1/3/2 from the inside to the outside) is preferred in light of the impact resistance. Alternatively, the layer (4) as the recovery layer, etc., is included, the construction of 2/3/1/3/4/2 from the inside to the outside, 2/4/3/1/3/4/2 from the inside to the outside, 4/3/1/3/4 from the inside to the outside or the like is preferred, and the construction of 2/3/1/3/4/2 from the inside to the outside or 2/4/3/1/3/4/2 from the inside to the outside is more preferred. It is to be noted that a construction in which the layer (4) is included in place of the layer (2) is acceptable, and in the case of a construction in which the layers (1) to (4)s are each used in a plurality of number, the resin constituting each layer may be identical or different. Moreover, the construction of 3/1/3 from the inside to the outside or 2/4/3/1/3/2 from the inside to the outside is acceptable.

Fuel Container

The fuel container according to another embodiment of the present invention includes the blow-molded container described above, and for example, a filter, a fuel gauge, a baffle plate and the like may be provided as needed. Due to including the blow-molded container, the fuel container is also superior in appearance, gas barrier properties, oil resistance and the like; therefore, it can be suitably used as a fuel container. The "fuel container" as referred to herein means a fuel container mounted in an automobile, a motorcycle, a watercraft, an aeroplane, an electric power generator, an industrial or agricultural instrument or the like, or a portable fuel container for supplying the fuel to such a fuel container, as well as a container for storing the fuel. Further, typical examples of the fuel include gasoline, in particular, oxygen-containing gasoline prepared by blending gasoline with methanol, ethanol, MTBE or the like, and further heavy oil, light mineral oil, kerosene and the like are also included. The fuel container is particularly suitably used as a fuel container for oxygen-containing gasoline among the fuels described above. The thickness of each layer of the blow-molded container used as the fuel container may be as follows, for example: 0.03 mm or greater and 0.5 mm or less for the layer (1); 0.2 mm or greater and 4 mm or less for each of the layers (2) and (4); and 0.03 mm or greater and 0.3 mm or less for the layer (3).

Blow-Molding Bottle Container

The blow-molded container according to the embodiment of the present invention is suitably used as a blow-molded bottle container. The molding method is exemplified by direct blow-molding, injection blow-molding, and the like. The blow-molded bottle container molded so as to have a bottle shape is also superior in appearance, gas barrier properties, oil resistance and the like; therefore, it can be suitably used as a bottle container for foods, cosmetics and the like. The thickness of each layer of the blow-molded bottle container may be as follows, for example: 5 µm or greater and 200 µm or less for the layer (1); 50 µm or greater and 2,000 µm or less for each of the layers (2) and (4); and 5 µm or greater and 2,000 µm or less for the layer (3).

EXAMPLES

Hereinafter, the present invention is specifically explained by way of Examples, but the present invention is not in anyhow limited to these Examples.

Synthesis of EVOH (I)

Synthesis Example 1

Using a 250 L pressure reactor, the polymerization was carried out under the following conditions to synthesize ethylene-vinyl acetate copolymer.

vinyl acetate: 83.0 kg,
methanol: 26.6 kg,
feed rate of 2,2'-azobis(4-methoxy-2,4-dimethylvaleronitrile) (2.5 g/L methanol solution): 1,119.5 mL/hr
polymerization temperature: 60° C.
pressure of ethylene in polymerization tank: 3.6 MPa
polymerization time period: 5.0 hours The conversion of vinyl acetate in the resulting copolymer was about 40%. After sorbic acid was added to this copolymerization reaction mixture, the reaction mixture was supplied to a purge tower, and unreacted vinyl acetate was eliminated from the top of the tower by introducing methanol vapor from the bottom of the tower, whereby a 41% by mass methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester component in the copolymer. Thereto was further added methanol to adjust the copolymer concentration to 20% by mass. The temperature of this solution was elevated to 60° C., and the reaction was allowed while blowing nitrogen gas into the reactor for about 4 hours. This solution was then extruded into water from a die plate provided with a circular opening to permit deposition, followed by cutting to give pellets having a diameter of about 3 mm and a length of about 5 mm. An operation of deliquoring the pellets using a centrifugal separator, and further adding a large amount of water thereto, and deliquoring the pellets was repeated.

Preparation of EVOH-Containing Resin Composition

Twenty kg of the deliquored pellets were added to 180 kg of a mixed solvent of water and methanol (mass ratio: water/methanol=40/60), and the mixture was stirred at 60° C. for 6 hours to completely dissolve the pellets. To the solution thus obtained were added the saturated carbonyl compound (II) and the conjugated polyene compound, and this mixture was further stirred for 1 hour such that the saturated carbonyl compound (II) and the conjugated polyene compound were completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin composition chips. The resulting porous resin composition chips were washed with an aqueous acetic acid solution and ion exchanged water. The resin composition chips were separated from the washing liquid, followed by deliquoring, and thereafter were dried in a hot-air dryer at 80° C. for 4 hours, and further at 100° C. for 16 hours to obtain a resin composition (dry resin composition pellets). The content of each component in the resin composition thus obtained was quantitatively determined according to the quantitative determination method, and designated as the content in the layer (1). A resin composition (I-1) was prepared such that the contents of saturated carbonyl compound (II) and the conjugated polyene compound were as shown in Tables 1 and 2 by adjusting the amount of the saturated carbonyl compound (II) added, and the concentration of each component in the aqueous solution for the immersion treatment.

Synthesis Example 2 and Preparation of EVOH-Containing Resin Composition

Pellets were obtained in a similar manner to Synthesis Example 1. Twenty kg of the pellets thus obtained and the saturated carbonyl compound (II) were added to 180 kg of a mixed solvent of water and methanol (mass ratio: water/methanol=40/60), and the mixture was stirred at 60° C. for 6 hours to completely dissolve the pellets and the saturated carbonyl compound (II). To the solution thus obtained were added sorbic acid as the conjugated polyene compound, and this mixture was further stirred for 1 hour such that sorbic acid was completely dissolved, whereby a resin composition solution was obtained. This resin composition solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin composition chips. After the resulting porous resin composition chips were washed with an aqueous acetic acid solution and ion exchanged water, an immersion treatment in an aqueous solution containing acetic acid, sodium acetate, potassium dihydrogen phosphate and boric acid was carried out. The resin composition chips were separated from the aqueous solution for the immersion treatment, followed by deliquoring, and thereafter were dried in a hot-air dryer at 80° C. for 4 hours, and further at 100° C. for 16 hours to obtain a resin composition (dry resin composition pellets). The content of each component in the resin composition thus obtained was quantitatively determined using the quantitative determination method. It is to be noted that a resin composition (I-2) was prepared such that the content of each component was as shown in Tables 1 and 2 by adjusting the concentration of each component in the aqueous solution for the immersion treatment.

Evaluation of EVOH-Containing Resin Composition

Each EVOH-containing resin composition thus obtained was evaluated as in the following. The results of the evaluations are shown together in Tables 1 and 2. In addition, each quantitative determination in these Examples was carried out using the following method.

(1) Determination of Moisture Content of Hydrous EVOH Pellets

The moisture content of hydrous EVOH pellets was determined under conditions involving a drying temperature of 180° C., a drying time period of 20 min and a sample amount of about 10 g using a halogen moisture analyzer "HR73" available from Mettler-Toledo International Inc. The moisture content of the hydrous EVOH set forth in the following is expressed in % by mass with respect to the mass of the dry EVOH.

(2) Ethylene Content and Degree of Saponification of EVOH(I)

The determination was made based on $^1$H-NMR recorded on a nuclear magnetic resonance apparatus (model "JNM-GX-500" available from JEOL, Ltd.) using DMSO-$d_6$ as a solvent.

(3) Quantitative Determination of Carboxylic Acid and Carboxylic Acid Ion

Dry EVOH pellets were ground by freeze grinding. Thus resulting ground EVOH was sieved with a sieve having a nominal dimension of 1 mm (according to normal sieve standard JIS Z8801-1 to 3). Ten grams of the EVOH powder having passed the sieve and 50 mL of ion exchanged water were charged into a stoppered 100 mL Erlenmeyer flask, and stirred 95° C. for 10 hours after the stoppered Erlenmeyer flask was equipped with a cooling condenser. Two mL of the resulting solution was diluted with 8 mL of ion exchanged water. The amount of a carboxylic acid ion in this diluted solution was quantitatively determined using an ion chromatography "ICS-1500" available from Yokogawa Electric Corporation according to the following measurement conditions, whereby the amount of the carboxylic acid and the carboxylic acid ion was calculated. It is to be noted that in the quantitative determination, a calibration curve created using a monocarboxylic acid or a polyhydric carboxylic acid was used.

Measurement Conditions:

column: "IonPAC ICE-AS1 (9ϕ×250 mm, electric conductivity detector)" available from DIONEX;

eluent: 1.0 mmol/L aqueous octanesulfonic acid solution;

measurement temperature: 35° C.;

eluent flow rate: 1 mL/min; and amount used for the analysis: 50 μL.

(4) Quantitative Determination of Metal Ion

Into a pressure container made from Teflon (registered trademark) available from Actac Project Services Corporation were charged 0.5 g of dry EVOH pellets, and 5 mL of nitric acid for accurate analysis available from Wako Pure Chemical Industries, Ltd. was further added thereto. After the pressure container was left to stand for 30 min, the container was closed with a cap lip having a rupture disk, and the dry EVOH pellets were treated at 150° C. for 10 min, and then 180° C. for 10 min using a microwave high speed decomposition system "speedwave MWS-2" available from Actac Project Services Corporation, whereby the dry EVOH pellets were decomposed. In a case where the decomposition of the dry EVOH pellets was incomplete, the treatment conditions were appropriately adjusted. The resulting decomposition product was diluted with 10 mL of ion exchanged water, all the liquid was transferred to a 50 mL volumetric flask, and the volume of the liquid was adjusted to 50 mL with ion exchanged water, whereby a decomposition product solution was prepared.

The decomposition product solution thus obtained was subjected to a quantitative determination analysis at the measurement wavelength set forth below using an ICP optical emission spectrophotometer "Optima 4300 DV" available from PerkinElmer Japan Co., Ltd., whereby the amounts of the metal ion, the phosphorus compound and the boron compound were quantitatively determined. The amount of the phosphorus compound was calculated as a mass in terms of phosphorus element equivalent after the quantitative determination of the phosphorus element. The content of the boron compound was calculated as a mass in terms of boric acid equivalent.

Na: 589.592 nm;
K: 766.490 nm;
Mg: 285.213 nm;
Ca: 317.933 nm;
P: 214.914 nm;
B: 249.667 nm;
Si: 251.611 nm;
Al: 396.153 nm;
Zr: 343.823 nm;
Ce: 413.764 nm;
W: 207.912 nm; and
Mo: 202.031 nm.

(5) Quantitative Determination of Saturated Carbonyl Compound (II)

An adjusted 2,4-dinitrophenylhydrazine (DNPH) solution was prepared by adding 50 mL of 1,1,1,3,3,3-hexafluoroisopropanol (HFIP), 11.5 mL of acetic acid and 8 mL of ion exchanged water to 200 mg of a 50% by mass solution of DNPH. Thereafter, 1 g of dry EVOH-containing resin composition pellets were added to 20 mL of the adjusted DNPH solution, and the mixture was stirred at 35° C. for 1 hour to dissolve the dry resin composition pellets. Acetonitrile was added to this solution to permit precipitation and sedimentation of the EVOH, followed by filtration, and the resulting solution was concentrated, whereby an extraction sample was obtained. This extraction sample was analyzed for quantitative determination by high performance liquid chromatography under the following conditions, whereby the saturated carbonyl compound (II) was quantitatively determined. In the quantitative determination, a calibration curve created from a reaction of an authentic sample of each saturated carbonyl compound (II) with the DNPH solution was used. It is to be noted that the detection lower limit of the saturated carbonyl compound (II) was 0.01 ppm. In addition, in the present application, the content of each component in the dry resin composition used for forming each layer of the blow-molded container was defined as the content of each component in the corresponding layer of the blow-molded container.

column: TSKgel ODS-80 Ts (available from Tosoh Corporation)
mobile phase: water/acetonitrile=52:48 (volume ratio)
detector: photodiode array detector (360 nm), TOF-MS (6) Quantitative Determination of Conjugated Polyene Compound Dry resin composition pellets were ground by freeze grinding, and 10 g of a ground matter obtained by eliminating coarse particles using a sieve having a nominal dimension of 0.150 mm (100 mesh, according to JIS Z8801-1 to 3) was packed into a Soxhlet extraction apparatus to execute an extraction treatment using 100 mL of chloroform for 48 hours. This extraction liquid was analyzed for quantitative determination by high performance liquid chromatography to quantitatively determine the amount of the conjugated polyene compound. It is to be noted that in the quantitative determination, a calibration curve created using an authentic sample of each conjugated polyene compound was used.

(7) Appearance of Solution (Transparency and Coloring Characteristic)

Ten grams of pellets obtained by subjecting the dry resin composition pellets to a heat treatment in an air at 120° C. for 15 hours were charged into a 300 mL Erlenmeyer flask, and 100 ml of a mixed solution of water and propanol (mass ratio: water/propanol=45/55) was added thereto, followed by stirring at 75° C. for 3 hours. The transparency and coloring of the solution after the heating and stirring for 3 hours was evaluated by a visual inspection in accordance with the following evaluation criteria.

Evaluation Criteria of Transparency

"favorable (A)": the solution being transparent, and suspended matter recognizable by the visual inspection being absent;

"somewhat favorable (B)": the solution being somewhat turbid, and suspended matter recognizable by the visual inspection being present; and "unfavorable (C)": the solution being turbid, and suspended matter being present.

Evaluation Criteria of Coloring of Solution

"favorable (A)": colorless;
"somewhat favorable (B)": somewhat colored; and
"unfavorable (C)": significantly colored.

(8) Motor Torque Fluctuation

Dry resin composition pellets in an amount of 60 g were kneaded in a Laboplast Mill ("20R200" available from Toyo Seiki Seisaku-sho, Ltd.; twin-screw, counter rotating type) at 100 rpm and 260° C., and a time period which was required until the torque value reached 1.5 times the torque value after 5 min from the beginning of the kneading was determined. The motor torque fluctuation was evaluated according to the following evaluation criteria.

"favorable (A)": 60 min or longer;
"somewhat favorable (B)": 40 min or longer and shorter than 60 min; and
"unfavorable (C)": shorter than 40 min.

(9) Odor in Molding

Into a 100 mL glass sample tube were charged 20 g of the resin composition pellets, and the opening of the sample tube was covered with an aluminum foil lid. Then, the sample tube was heated in a hot-air dryer at 220° C. for 30 min. The sample tube was taken out from the dryer and allowed to cool at room temperature for 30 min. Thereafter, the sample tube was shaken two or three times, and an evaluation of the odor was made after removing the aluminum foil lid. The intensity of the odor of the sample pellets was evaluated according to the following evaluation criteria.

A: an odor not being recognized;
B: an odor being slightly recognized; and
C: an odor being clearly recognized.

Preparation of Recovered Resin

After 4 parts by mass of the dry EVOH resin pellets, 86 parts by mass of a high-density polyethylene resin (HZ8200B available from Mitsui Petrochemical Industries; MFR under 2,160 g load at 190° C.: 0.01 g/10 min), and 10 parts by mass of an adhesive resin (ADMER GT-6A available from Mitsui Chemicals, Inc.; MFR under 2,160 g at 190° C.: 0.94 g/10 min) were dry-blended, and the blend was extruded and pelletized under a nitrogen atmosphere using a twin-screw extruder ("2D25W" available from Toyo Seiki Seisaku-sho, Ltd.; 25 mmϕ, die temperature of 220° C., and screw rotation speed of 100 rpm). To further obtain a recovered resin model, the extruded pellets were further extruded and pelletized using the same extruder under the same conditions, and the same operation was repeated four times (the blending in the extruder was repeated five times in total) to obtain a recovered resin.

Production of Blow-Molded Container

Examples 1 to 28 and Comparative Examples 1 to 6

Pellets of each dry EVOH resin shown in Tables 1 and 2, the high-density polyethylene resin, the adhesive resin and the recovered resin were used to give a parison of 6 layers involving 4 types, i.e., high-density polyethylene/adhesive resin/EVOH/adhesive resin/recovered resin/resin composition, from the inside to the outside, which was allowed to run for 2 hours in a blow-molding machine TB-ST-6P manufactured by Suzuki Seiko Co., Ltd. at 210° C., and the operation was stopped for 2 hours with the state of heating. Thereafter, the operation was restarted, and blow molded containers produced after each specified time period were evaluated. It is to be noted that in the production of the blow-molded container, cooling at an internal temperature of the die of 15° C. for 20 sec lead molding of a 3-L tank having the entire layer thickness of 1,000 μm (high-density polyethylene/adhesive resin/EVOH/adhesive resin/recovered resin/resin composition, from the inside to the outside, = 340/50/40/50/400/120 μm, from the inside to the outside. The tank had a bottom face diameter of 100 mm, and a height of 400 mm. Also, it is to be noted that dry EVOH resin pellets of Examples 1 to 11, 13 and 14, Comparative Examples 1 and 2, Examples 15 to 25, 27 and 28, and Comparative Examples 4 and 5 were obtained according to Synthesis Example 1 described above (I-1). Dry EVOH resin pellets of Example 12 and Example 26 were obtained using (I-2) obtained in Synthesis Example 2 described above. Dry EVOH resin pellets of Comparative Examples 3 and 6 were obtained in Synthesis Example 1, but in the preparation of EVOH-containing resin composition, the saturated aldehyde (II-1) and the saturated ketone (II-2) were not added to the EVOH-containing resin compositions for Comparative Examples 3 and 6, respectively.

Evaluation of Blow-Molded Container

Each blow-molded container thus obtained was evaluated as in the following. The results of the evaluations are shown together in Tables 1 and 2.

(10) Evaluation of Blow-Molded Container

Evaluation of Appearance

With respect to a 3-L tank molded after 40 min from restarting, evaluation on appearance characteristics were made through evaluating streaks and coloring by a visual inspection in accordance with the following criteria.

Evaluation Criteria of Streaks
"favorable (A)": no streaks found;
"somewhat favorable (B)": streaks found; and
"unfavorable (C)": a large number of streaks found.

Evaluation Criteria of Coloring
"favorable (A)": colorless;
"somewhat favorable (B)": yellowed; and
"unfavorable (C)": significantly yellowed.

Evaluation of Impact Resistance

A 3-L tank formed by blow-molding after 20 min, 40 min, and 10 hours from the restarting was filled with 2.5 L of propylene glycol, and the opening was capped by heat sealing using a film having a structure of polyethylene 40 μm/aluminum foil 12 μm/polyethylene terephthalate 12 μm. This tank was cooled at −40° C. for 3 days, and thereafter dropped from a height of 6 m with the opening of the 3-L tank facing upward. The impact resistance was evaluated in accordance with the number of broken containers (n=10). The impact resistance after 20 min from the restarting is an indicator of the self-purge feature.

Evaluation Criteria of Impact Resistance:
"favorable (A)": less than 3;
"somewhat favorable (B)": 3 to less than 6; and
"unfavorable (C)": 6 or greater.

TABLE 1

| | Resin composition used | Saturated aldehyde (II-1) substance | content (ppm) | Conjugated polyene compound type | content (ppm) | Average thickness of layer (1) (%) | EVOH content in layer (4) (% by mass) | Evaluations odor in molding | appearance of solution transparency | coloring |
|---|---|---|---|---|---|---|---|---|---|---|
| Example 1 | I-1 | propanal | 35 | sorbic acid | 1,200 | 4 | 6.7 | B | A | B |
| Example 2 | I-1 | propanal | 0.3 | sorbic acid | 200 | 4 | 6.7 | A | A | A |
| Example 3 | I-1 | propanal | 0.3 | sorbic acid | 0.01 | 4 | 6.7 | A | A | B |
| Example 4 | I-1 | propanal | 0.3 | sorbic acid | 0.2 | 4 | 6.7 | A | A | B |
| Example 5 | I-1 | propanal | 0.3 | sorbic acid | 950 | 4 | 6.7 | A | A | B |
| Example 6 | I-1 | propanal | 0.3 | sorbic acid | 2,000 | 4 | 6.7 | A | A | B |
| Example 7 | I-1 | propanal | 0.3 | potassium sorbate | 200 | 4 | 6.7 | A | A | A |
| Example 8 | I-1 | propanal | 0.3 | myrcene | 200 | 4 | 6.7 | A | A | B |
| Example 9 | I-1 | propanal | 2.5 | sorbic acid | 200 | 4 | 6.7 | A | A | A |
| Example 10 | I-1 | propanal | 18 | sorbic acid | 200 | 4 | 6.7 | A | A | B |
| Example 11 | I-1 | propanal | 0.08 | sorbic acid | 200 | 4 | 6.7 | A | A | B |
| Example 12 | I-2 | propanal | 90 | sorbic acid | 50 | 4 | 6.7 | A | A | A |
| Example 13 | I-1 | butanal | 35 | sorbic acid | 200 | 4 | 6.7 | B | A | B |
| Example 14 | I-1 | hexanal | 35 | sorbic acid | 200 | 4 | 6.7 | B | A | B |
| Comparative Example 1 | I-1 | propanal | N.D.*1 | sorbic acid | 1,000 | 4 | 6.7 | C | C | C |
| Comparative Example 2 | I-1 | propanal | 500 | sorbic acid | 200 | 4 | 6.7 | C | C | C |

TABLE 1-continued

| | | | | | | | | | | |
|---|---|---|---|---|---|---|---|---|---|---|
| Comparative Example 3 | I-1 | propanal | N.D.*¹ | sorbic acid | 6,000 | 4 | 6.7 | C | C | C |

| | Evaluations | | | | | |
|---|---|---|---|---|---|---|
| | motor torque | appearance | | impact resistance | | |
| | fluctuation | streaks | coloring | 20 min | 40 min | 10 hours |
| Example 1 | A | B | B | A | B | B |
| Example 2 | A | A | A | A | A | A |
| Example 3 | B | B | B | A | B | B |
| Example 4 | B | A | A | A | A | B |
| Example 5 | B | A | A | A | A | A |
| Example 6 | B | B | B | B | B | B |
| Example 7 | A | A | A | A | A | A |
| Example 8 | B | A | A | A | A | B |
| Example 9 | A | A | A | A | A | A |
| Example 10 | A | A | A | A | A | A |
| Example 11 | A | B | B | A | B | B |
| Example 12 | A | A | A | A | A | A |
| Example 13 | B | A | B | A | B | B |
| Example 14 | B | A | B | A | B | B |
| Comparative Example 1 | C | B | B | B | C | C |
| Comparative Example 2 | C | C | C | C | C | C |
| Comparative Example 3 | C | C | C | C | C | C |

*¹N.D. less than detection lower limit (0.01 ppm)

TABLE 2

| | Resin composition used | Saturated ketone (II-2) | | Conjugated polyene compound | | Average thickness of layer (1) (%) | EVOH content in layer (4) (% by mass) |
|---|---|---|---|---|---|---|---|
| | | substance | content (ppm) | type | content (ppm) | | |
| Example 15 | I-1 | acetone | 35 | sorbic acid | 1,200 | 4 | 6.7 |
| Example 16 | I-1 | acetone | 0.3 | sorbic acid | 200 | 4 | 6.7 |
| Example 17 | I-1 | acetone | 0.3 | sorbic acid | 0.01 | 4 | 6.7 |
| Example 18 | I-1 | acetone | 0.3 | sorbic acid | 0.2 | 4 | 6.7 |
| Example 19 | I-1 | acetone | 0.3 | sorbic acid | 950 | 4 | 6.7 |
| Example 20 | I-1 | acetone | 0.3 | sorbic acid | 2,000 | 4 | 6.7 |
| Example 21 | I-1 | acetone | 0.3 | potassium sorbate | 200 | 4 | 6.7 |
| Example 22 | I-1 | acetone | 0.3 | myrcene | 200 | 4 | 6.7 |
| Example 23 | I-1 | acetone | 2.5 | sorbic acid | 200 | 4 | 6.7 |
| Example 24 | I-1 | acetone | 18 | sorbic acid | 200 | 4 | 6.7 |
| Example 25 | I-1 | acetone | 0.08 | sorbic acid | 200 | 4 | 6.7 |
| Example 26 | I-2 | acetone | 90 | sorbic acid | 50 | 4 | 6.7 |
| Example 27 | I-1 | methyl ethyl ketone | 35 | sorbic acid | 200 | 4 | 6.7 |
| Example 28 | I-1 | 2-hexanone | 35 | sorbic acid | 200 | 4 | 6.7 |
| Comparative Example 4 | I-1 | acetone | N.D.*¹ | sorbic acid | 1,000 | 4 | 6.7 |
| Comparative Example 5 | I-1 | acetone | 500 | sorbic acid | 200 | 4 | 6.7 |
| Comparative Example 6 | I-1 | acetone | N.D.*¹ | sorbic acid | 6,000 | 4 | 6.7 |

| | Evaluations | | | | | | | |
|---|---|---|---|---|---|---|---|---|
| | odor in molding | appearance of solution | | motor torque fluctuation | appearance | | impact resistance | | |
| | | transparency | coloring | | streaks | coloring | 20 min | 40 min | 10 hours |
| Example 15 | B | A | B | A | B | B | A | B | B |
| Example 16 | A | A | A | A | A | A | A | A | A |
| Example 17 | A | A | B | B | B | B | A | B | B |
| Example 18 | A | A | B | B | A | A | A | A | B |
| Example 19 | A | A | B | B | A | A | A | A | A |
| Example 20 | A | A | B | B | B | B | B | B | B |
| Example 21 | A | A | B | A | A | A | A | A | A |
| Example 22 | A | A | B | B | A | A | A | A | B |
| Example 23 | A | A | A | A | A | A | A | A | A |
| Example 24 | A | A | B | A | A | A | A | A | A |

TABLE 2-continued

| | | | | | | | | | |
|---|---|---|---|---|---|---|---|---|---|
| Example 25 | A | A | B | A | B | B | A | B | B |
| Example 26 | B | A | A | A | A | A | A | A | A |
| Example 27 | B | B | B | B | A | B | A | B | B |
| Example 28 | B | B | B | B | A | B | A | B | B |
| Comparative Example 4 | C | C | C | C | B | B | B | C | C |
| Comparative Example 5 | C | C | C | C | C | C | C | C | C |
| Comparative Example 6 | C | C | C | C | C | C | C | C | C |

*[1]N.D. less than detection lower limit, 0.01 ppm

As shown in Tables 1 and 2, the blow-molded container according to the embodiment of the present invention was proven to exhibit inhibited coloring, odor, and generation of streaks, and have a superior appearance and the like. In addition, the blow-molded container according to the embodiment of the present invention exhibited superior impact resistance even when the blow-molded container was molded after 20 min from the restarting of the molding apparatus. It was found that due to the use of the EVOH-containing resin composition that was superior in self-purge feature, the blow-molded container according to the embodiment of the present invention exhibited inhibited occurrence of gelation and the like which would deteriorate the impact resistance within a short time period from the restarting of the coextrusion molding apparatus. Furthermore, the blow-molded containers of Example 2, 7, 9, 10, 12, 16, 21, 23, 24 and 26 in which the type and content of the saturated carbonyl compound (II), and the type and content of the conjugated polyene compound were as specified were proved to exhibit further inhibited coloring, odor, and generation of streaks, and have more superior appearance, impact resistance and the like.

On the other hand, it was proved that in a case where the type and content of the saturated carbonyl compound (II) failed to meet the specified requirements (Comparative Examples 1 to 6), the inhibitory effect on the coloring, odor, and generation of streaks, and the impact resistance were impaired.

INDUSTRIAL APPLICABILITY

The blow-molded container according to the embodiment of the present invention exhibits satisfactory gas barrier properties and oil resistance which are characteristics of the EVOH, and additionally since the specified amount of the saturated carbonyl compound (II) is contained in the layer (1), the coloring, the odor, and the generation of defects such as gelation and streaks which are caused on melt molding are inhibited, and accordingly the blow-molded container has a superior appearance. Moreover, according to the blow-molded container, due to the layer (1) containing the specified amount of the saturated carbonyl compound (II), a superior self-purge feature is also exhibited in a production process, and accordingly the production cost of the blow-molded container can be reduced. Thus, the blow-molded container can be used in a variety of intended usages, and in particular, can be suitably used as a fuel container.

EXPLANATION OF THE REFERENCE SYMBOLS

1 layer (1)
2 layer (2)
3 layer (3)
4 layer (4)
5 blow-molded container
6 container inner surface
7 container outer surface

The invention claimed is:
1. A blow-molded container, comprising a first layer comprising:
   an ethylene-vinyl alcohol copolymer (I); and
   a saturated carbonyl compound (II) having 3 to 8 carbon atoms, wherein:
   the saturated carbonyl compound (II) is a saturated aldehyde (II-1), a saturated ketone (II-2) or a combination thereof; and
   a content of the saturated carbonyl compound (II) in the first layer is 0.01 ppm or greater and 100 ppm or less.
2. The blow-molded container according to claim 1, wherein the saturated carbonyl compound (II) is propanal, butanal, hexanal or a combination thereof.
3. The blow-molded container according to claim 1, wherein the saturated carbonyl compound (II) is acetone, methyl ethyl ketone, 2-hexanone or a combination thereof.
4. A fuel container, comprising the blow-molded container according to claim 1.
5. The blow-molded container according to claim 1, which is a bottle.
6. method comprising blow-molding A method for producing the blow-molded container of claim 1, the method comprising blow-molding with a resin composition comprising the ethylene-vinyl alcohol copolymer (I) having 3 to 8 carbon atoms,
   wherein:
   the saturated carbonyl compound (II) is the saturated aldehyde (II-1), the saturated ketone (II-2) or a combination thereof; and
   the content of the saturated carbonyl compound (II) in the resin composition is 0.01 ppm or greater and 100 ppm or less.
7. The blow-molded container according to claim 1, wherein:
   the first layer comprises a conjugated polyene compound; and
   a content of the conjugated polyene compound is 0.01 ppm or greater and 1,000 ppm or less.
8. The blow-molded container according to claim 7, wherein the conjugated polyene compound is sorbic acid, a sorbic acid salt or a combination thereof.
9. The blow-molded container according to claim 1, comprising:
   a pair of second layers that are formed of a thermoplastic resin having a solubility parameter calculated using a Fedors equation of 11 $(cal/cm^3)^{1/2}$ or less and are arranged on an inner face side and an outer face side of the first layer, respectivelyl; and a pair of third layers that are formed of a carboxylic acid-modified polyolefin and are each arranged between the first layer and each of the pair of second layers.

10. The blow-molded container according to claim 9, further comprising:
a fourth layer comprising the ethylene-vinyl alcohol copolymer (I), the thermoplastic resin and the carboxylic acid-modified polyolefin.

11. The blow-molded container according to claim 10, wherein the fourth layer is formed using a recovered material from the first layer, the second layer and the third layer in a production process of the blow-molded container.

12. The blow-molded container according to claim 10, wherein:
an average thickness of the first layer accounts for 5.0% or less of an average entire layer thickness; and
a content of the ethylene-vinyl alcohol copolymer in the fourth layer is 9.0% by mass or less.

* * * * *

UNITED STATES PATENT AND TRADEMARK OFFICE
CERTIFICATE OF CORRECTION

PATENT NO. : 9,579,840 B2
APPLICATION NO. : 15/026140
DATED : February 28, 2017
INVENTOR(S) : Hiroshi Kawai It is certified that error appears in the above-identified patent and that said Letters Patent is hereby corrected as shown below:

In the Claims

Column 26, Line 40, Claim 6, "6. method comprising blow-molding A method" should read
--6. A method--

Column 26, Line 67, Claim 9, "layer, respectivelyl" should read --layer, respectively--

Signed and Sealed this
Seventeenth Day of April, 2018

Andrei Iancu
*Director of the United States Patent and Trademark Office*